E. G. S. CLARE.
SAW SET DRESSING TOOL.
APPLICATION FILED DEC. 20, 1919.

1,368,698.

Patented Feb. 15, 1921.
2 SHEETS—SHEET 1.

WITNESSES

INVENTOR
EDWARD G. S. CLARE,
BY
ATTORNEYS

E. G. S. CLARE.
SAW SET DRESSING TOOL.
APPLICATION FILED DEC. 20, 1919.

1,368,698.

Patented Feb. 15, 1921.
2 SHEETS—SHEET 2.

WITNESSES

INVENTOR
EDWARD G. S. CLARE,
BY
ATTORNEYS

UNITED STATES PATENT OFFICE.

EDWARD G. S. CLARE, OF SEATTLE, WASHINGTON.

SAW-SET-DRESSING TOOL.

1,368,698.   Specification of Letters Patent.   Patented Feb. 15, 1921.

Application filed December 20, 1919. Serial No. 346,204.

*To all whom it may concern:*

Be it known that I, EDWARD G. S. CLARE, a subject of the King of Great Britain, and a resident of Seattle, in the county of King and State of Washington, have invented certain new and useful Improvements in Saw-Set-Dressing Tools, of which the following is a specification.

My invention is an improvement in saw set dressing tools, and has for its object to provide a device of the character specified especially designed to be used after the saw is set and jointed and before filing, to dress down the set in each tooth of the saw, until all the teeth are in the same plane with each other, thus making a perfect set and to remove the wire edge from the teeth after filing.

In the embodiment of the invention shown the improved tool comprises a body 1 of suitable size and weight, and channel shaped, the body having at each side edge an upstanding flange or rib 2 for strengthening and reinforcing the body. This body is provided with longitudinally extending slots 3, one of the slots being arranged near each side edge of the body, and runners 4 and 5 in the form of angle plates are adjustably connected with the body, by means of screws which are passed through the slots from above and have threaded engagement with the angle plates.

Figure 1:
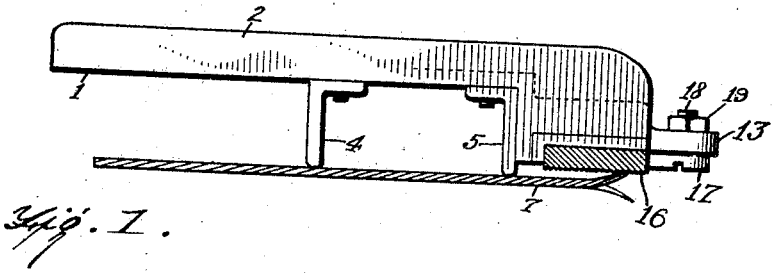
Figure 1 is a side view of the improved tool.
Figure 2:
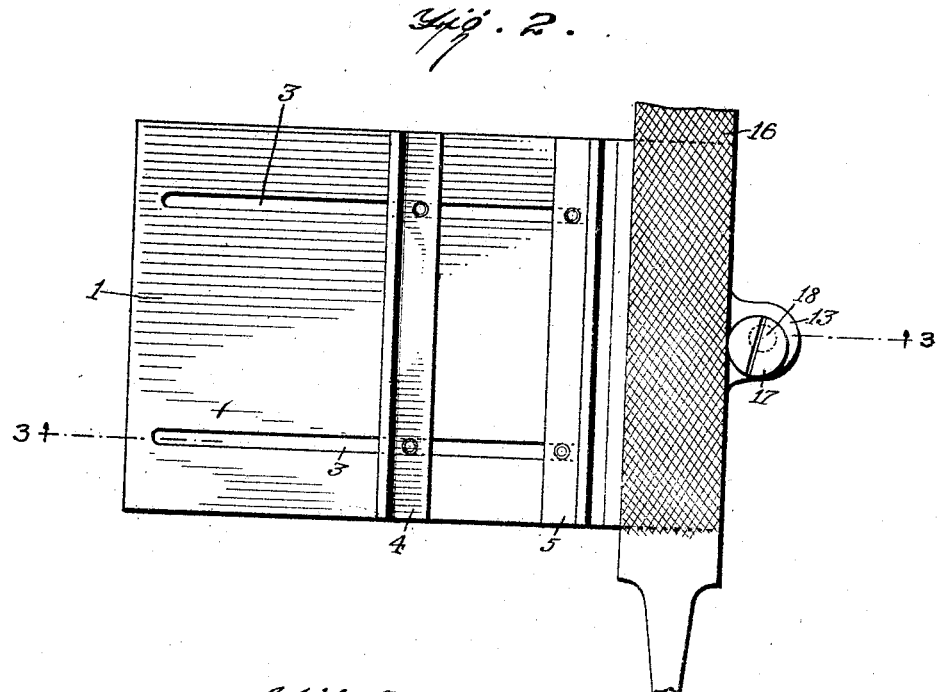
Fig. 2 is a bottom plan view.
Figure 3:
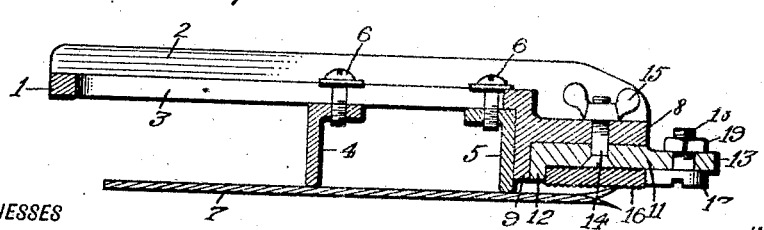
Fig. 3 is a section on the line 3—3 of Fig. 2.
Figure 4:
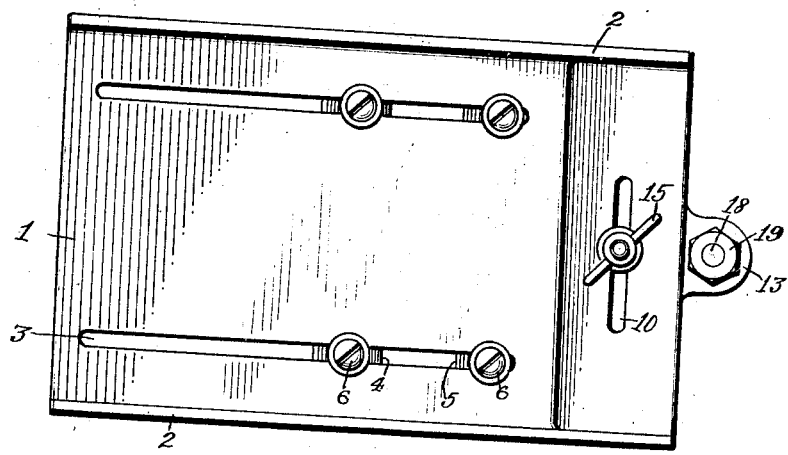
Fig. 4 is a top plan view.

Referring to Figs. 1 and 3, it will be seen that each of these angle plates consists of a relatively wide portion and a relatively narrow portion extending at a right angle, the relatively narrow portions sliding on the under face of the body and the relatively wide portions are adapted to engage the saw 7 which is to be dressed, and the free edges of the said portions are rounded, as shown.

Figure 5:
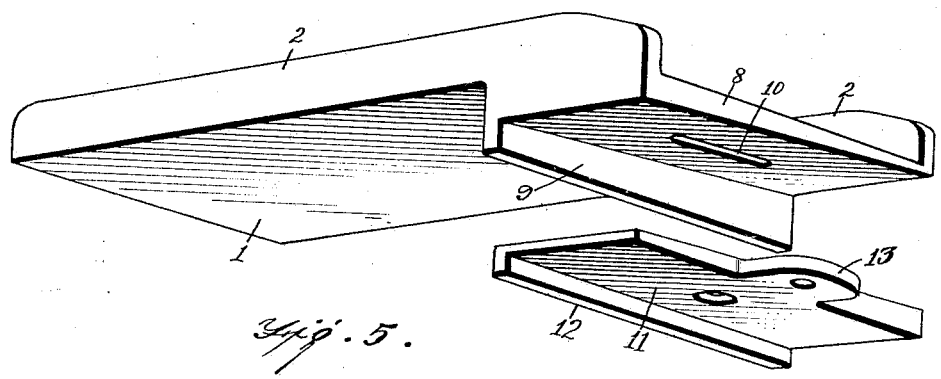
Fig. 5 is a perspective view looking from below, with the file bed detached.
Figure 6:
Fig. 6 is a transverse section at the file bed.
Figure 6:
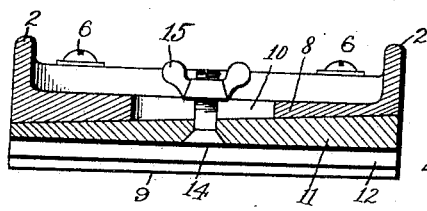

At one end the body has a portion 8 which is offset laterally from the plane of the body, in the same direction as the angle plates 4 and 5, and this offset portion is connected to the body by a web 9 which extends beyond the offset portion as shown in Figs. 3 and 5. This offset portion 8, it will be noticed referring to Fig. 6, is of greatest thickness at one end, gradually decreasing in thickness toward the other, and intermediate the side edges of the body the said portion is provided with a longitudinally extending slot 10.

The file bed is in the form of an angle plate, comprising a body 11 and a laterally extending flange or rib 12 at one side edge, the other side edge of the body having a perforated ear 13. The body 11 is of greatest thickness at one end, gradually decreasing in thickness toward the other, and it is seated upon the offset portion 8 in such manner that the thick end of the bed is at the thin end of the offset portion. Thus the bed and the offset portion have coöperating inclined or wedge surfaces, which, when the bed is moved transversely of the body, coöperate to move the face of the bed which supports the file toward or from the saw.

The bed is held to the offset portion by means of a screw 14 which is passed through the body 11 of the bed and through the slot 10 before mentioned. Above the offset portion the screw is engaged by a wing nut 15, and it will be noticed that the head of the screw is sunk in the body 11 of the bed so that it is flush with that face of the bed which supports the file indicated at 16. The file is clamped against the rib 12 of the bed, by means of the eccentric head 17 of a bolt 18 which passes through the perforated ear 13, and is engaged by a nut 19 above the ear. By means of the eccentric head of the bolt the file may be easily clamped in place or released when desired.

In operation, the file being clamped in place and the runners 4 and 5 adjusted to the proper point on the body and being rigidly held in parallel position by the screws 6, the device is placed on one face of the saw, as shown in Fig. 1, with the file at the teeth of the saw. The engaging face of the file is spaced just far enough from the plane of the saw to properly dress the teeth which have been set and jointed, but not filed. With the parts so arranged the file is moved longitudinally of the saw, and it will be evident that the teeth will be dressed so that all are in the same plane.

After filing, the tool is again moved along the saw to remove the wire edge from the teeth. By loosening the wing nut 15 and moving the file bed transversely of the body in the proper direction, the distance of the engaging face of the file from the saw may be varied.

The improved tool may be used for dressing circular saws as well as straight saws, and it will be noticed that the runners 4 and 5 are set some distance from that end of the tool remote from the file bed, in order that they may clear the handle of a hand saw. The improved tool may be made of different sizes for different sizes of saws. With small saws, such as hand saws, the file is smaller and the runners are set close enough so that the runner remote from the file will remain on the saw at the narrow end thereof.

In using the tool it is important that the saw be placed on a perfectly flat surface in order to obtain the best result and both runners must contact with the saw at all times. Furthermore, the pressure must be applied from the runners and not from the file. There is no possibility of removing too much of the set, since the adjustment permits only so much to be removed.

I claim:

1. A tool of the character specified comprising a body having at one end a transversely extending guideway, runners for engaging the saw adjustable on the body toward and from each other and longitudinally of the body, a file bed held on the guideway and adjustable longitudinally thereof, said guideway and file bed having coöperating inclined or wedge surfaces for moving the file bed toward and from the plane through the engaging surfaces of the runners, means in connection with the bed for clamping a file thereto, said means comprising a bolt having an eccentric head for engaging the edge of the file, the bed having a rib for engaging the other edge, and having a perforated ear through which the bolt extends, and a nut engaging the bolt.

2. A tool of the character specified comprising a body having at one end a transversely extending guideway, runners for engaging the saw adjustable on the body toward and from each other and longitudinally of the body, a file bed held in the guideway and adjustable longitudinally thereof, said guideway and file bed having coöperating inclined or wedge surfaces for moving the file bed toward and from the plane through the engaging surfaces of the runners, and means in connection with the bed for clamping a file thereto.

3. A device of the character specified comprising a body having runners extending transversely thereof and adjustable longitudinally of the body, a file bed detachably connected with one end of the tool, said bed and body having coöperating wedge shaped surfaces to move the supporting face of the file bed toward and from the body when the file bed is moved transversely of the body, means for clamping a file to the bed, said means comprising a bolt engaging the bed and having an eccentric head for engaging one edge of the file, the bed having a rib for engaging the other end, and a nut engaging the bolt.

4. A device of the character specified comprising a body having runners extending transversely thereof and adjustable longitudinally of the body, a file bed detachably connected with one end of the tool, said bed and body having coöperating wedge shaped surfaces to move the supporting face of the file bed toward and from the body when the file bed is moved transversely of the body, and means for clamping a file to the bed.

5. A device of the character specified comprising a body having runners extending transversely thereof, a file bed connected with one end of the body, and means in connection with the body and the bed for moving said bed toward the plane through the engaging faces of the runners when the bed is moved in one direction and for moving it away from said plane when the bed is moved in the other direction.

EDWARD G. S. CLARE.